United States Patent Office 3,827,946
Patented Aug. 6, 1974

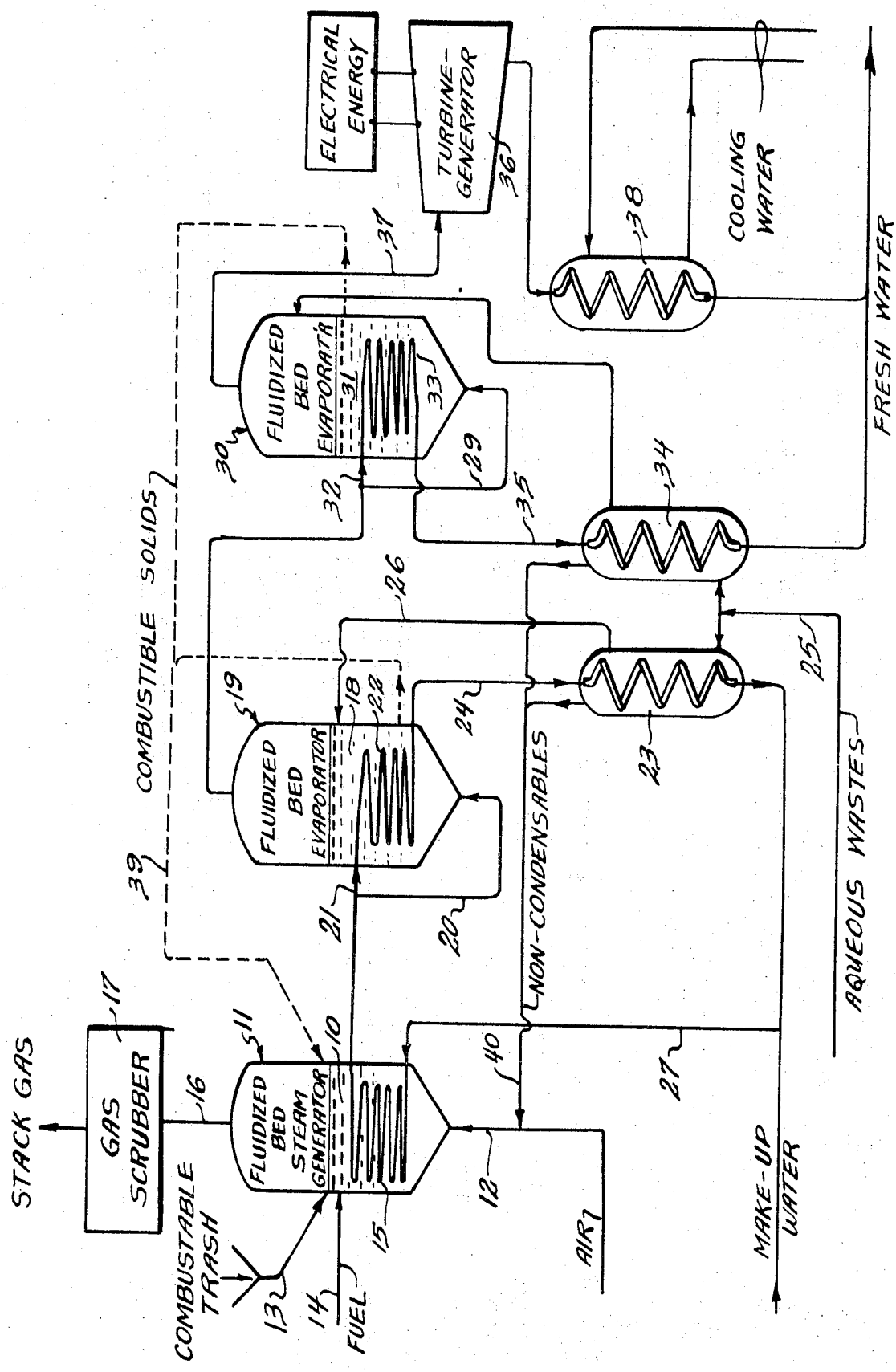

3,827,946
METHOD FOR THE DISPOSAL OF COMBUSTIBLE AND DILUTE AQUEOUS WASTES
Earl S. Grimmett and Philip E. Lamont, Idaho Falls, Idaho, assignors to the United States of America as represented by the United States Atomic Energy Commission
Filed June 5, 1972, Ser. No. 259,797
Int. Cl. B01d 3/00
U.S. Cl. 203—10                                     2 Claims

ABSTRACT OF THE DISCLOSURE

A method for the disposal of combustible and dilute aqueous wastes in which potable water and useful power are produced. Combustible waste, together if necessary with conventional fuel, is burned in a fluidized-bed steam generator; the steam thus produced is used to evaporate dilute aqueous wastes in the first stage of a two-stage fluidized-bed evaporator; the steam in the first stage is used to evaporate dilute aqueous wastes in the second stage of the two-stage fluidized-bed steam generator; the steam produced in the second stage is used to generate power; and the spent steam from the first and second fluidized-bed evaporators is condensed as potable water.

CONTRACTUAL ORIGIN OF THE INVENTION

The invention described herein was made in the course of, or under, a contract with the United States Atomic Energy Commission.

BACKGROUND OF THE INVENTION

This invention relates to a waste disposal process. In more detail, the invention relates to a waste management process for disposing of combustible and dilute aqueous wastes wherein potable water and useful power are produced. In other words, the invention relates to a process for producing useful power and potable water from combustible and dilute aqueous wastes.

The multitudinous problems arising from the seemingly infinite quantity of waste materials produced in our populous and highly industrialized society have resulted in a multitude of proposed solutions. Most proposed procedures for waste disposal treat a single type of waste without attempting to consider how all or most industrial and municipal wastes could be treated according to a unified scheme. All proposed procedures have one thing in common; they are expensive. In other areas it is common to reduce expense by utilizing by-products which may be vastly different from the primary product of the process. There is no reason why waste management should be different and, of course, by-product utilization of, for example, sludges as fertilizer is common. According to the present invention, waste management techniques that have recently been developed for the management of radioactive wastes are utilized in a process for handling combustible and dilute aqueous industrial and municipal wastes wherein the cost of waste disposal is reduced by the value of potable water and useful power produced in the process.

SUMMARY OF THE INVENTION

Accordingly to the present invention, fluidized-bed techniques are employed to dispose of combustible waste materials and dilute aqueous wastes and simultaneously produce useful power and potable water.

Combustible trash plus any necessary conventional fuel is burned in a fluidized-bed burner which is used to generate steam. The steam thus produced is used to evaporate dilute aqueous wastes in the first stage of a fluidized-bed evaporator and the steam produced in the first stage is used to evaporate dilute aqueous wastes in the second stage of a fluidized-bed evaporator. The steam produced in the second stage is used to generate power and the spent steam from both stages of fluidized-bed evaporation is condensed as potable water.

BRIEF DESCRIPTION OF THE DRAWING

The invention will next be described in connection with the accompanying drawing wherein the single figure is a flow sheet of a waste disposal process wherein electrical power and potable water are produced.

SPECIFIC EMBODIMENT OF THE INVENTION

As shown in the drawing, a bed 10 of sand particles or some other inert material in fluidized-bed steam generator 11 is fluidized with air introduced into the bed through line 12. Combustible trash, introduced into steam generator through line 13, and a conventional fuel such as kerosene, introduced through line 14, are burned in the fluidized-bed steam generator to boil water contained within coil 15 which is disposed within fluidized bed 10. Off-gases leave the steam generator through line 16 and are subjected to conventional scrubbing practices in gas scrubber 17 before release to the atmosphere.

Steam at a temperature of 1000° F. and pressure of 2400 p.s.i.a. formed in coil 15 are employed to heat and fluidize a bed 18 of sand particles or some other inert material contained within the first stage 19 of a fluidized-bed evaporator, about 10% of the steam from coil 15 being directed to the bottom of first stage 19 of the fluidized-bed evaporator through line 20 to fluidize the bed 18 of sand particles and the remainder of the steam from coil 15 being directed through line 21 to coil 22 immersed within fluidized bed 18 to heat the fluidized bed 10. From coil 22 the condensed steam (hot water) is directed to preheater 23 through line 24 where it gives up its heat to dilute aqueous wastes such as municipal sewage introduced thereinto through line 25, the aqueous wastes then being sprayed into the first stage of the fluidized-bed evaporator through line 26 and the cooled water from preheater 23 being returned to coil 15 through line 27. Makeup water is obtained from the fresh water produced in the system so that the fluidizing steam for evaporator 19 circulates within the system.

About 10% of the steam produced in the first stage 19 of the fluidized-bed evaporator at a temperature of 550° F. and pressure of 1055 p.s.i.a. is conducted through line 29 to the bottom of second stage 30 of fluidized-bed evaporator to fluidize a bed 31 of sand particles or another inert material contained therein, the remainder of the steam produced in the first stage being conducted through line 32 to coil 33 disposed in fluidized bed 31. Dilute aqueous wastes are fed into preheater 34 from line 25 where they flow countercurrent to hot water coming from coil 33 in the second-stage fluidized-bed evaporator through line 35. Steam produced in second-stage fluidized-bed evaporator 30 at a temperature of 450° F. and pressure of 425 p.s.i.a. is conducted to turbine generator 36 through line 37 prior to being condensed in condenser 38. The fresh water obtained from condenser 38 and preheater 34 constitutes one of the useful products of the process. In addition, combustible solids produced in both stages of fluidized-bed evaporation may be fed to fluidized-bed steam generator 11 as indicated by dotted lines 39 and noncondensable gases driven out of the aqueous wastes in preheaters 23 and 34 are vented to fluidized air line 12 through line 40.

The system as described is designed to process the sewage from a city having a population of about 55,000. The electrical power consumption of such a city is approximately 45 kwe. By using two stages of evaporations, the amount of steam leaving the last stage is sufficient in quantity and quality to generate 47 kwe. of electricity. Thus a city of this size can combine its sewage disposal system with a municipal power generation system and at the same time dispose of its burnable solid trash.

According to an alternative arrangement, the steam from fluidized-bed steam generator 11 can be introduced into a back pressure turbine and then introduced into the headend of a multistage fluidized-bed evaporator. By using this system, the advantage of generating high-pressure superheated steam is obtained. According to another alternate, steam from the fluidized-bed steam generator 11 is passed through a turbine which generates both electrical and mechanical power. The mechanical power is used to operate the compressor used in a vapor compression cycle fluidized-bed evaporator, and the electrical power can be a salable by-product.

In order to make the electrical-generating capacity of this system match the quantity of sewage disposed of in this typical city, a system according to the present invention may be combined with an advanced sewage treatment plant proposed by others, wherein after secondary treatment a part of the waste water is subjected to coagulation and sedimentation and another part is evaporated for purification. According to the present invention, the disclosed fluidized-bed evaporation process is substituted for the conventional evaporation procedures contemplated in the prior suggestion.

The embodiments of the invention in which an exclusive property or privilege is claimed are defined as follows:

1. A method for the disposal of combustible and dilute aqueous wastes in which potable water and useful power are produced comprising establishing and maintaining a first fluidized bed of an inert material by passing air upwardly therethrough, boiling water in said fluidized bed by burning combustible waste and conventional fuel therein, establishing and maintaining a second fluidized bed of an inert material by passing a portion of the steam produced in the first fluidized bed upwardly therethrough, introducing dilute aqueous wastes into said second fluidized bed, evaporating the water from said dilute aqueous wastes by flowing the remainder of the steam produced in the first fluidized bed through the second fluidized bed in indirect heat exchange with said dilute aqueous wastes, preheating the dilute aqueous wastes prior to introducing them into the second fluidized bed with the hot water condensed in the second fluidized bed from steam produced in the first fluidized bed, returning the condensed water to the first fluidized bed to be reboiled along with makeup water, establishing and maintaining a third fluidized bed of an inert material by passing a portion of the steam produced in the second fluidized bed upwardly therethrough, introducing dilute aqueous wastes into said third fluidized bed, evaporating the water from said dilute aqueous wastes by flowing the remainder of the steam produced in the second fluidized bed through the third fluidized bed in indirect heat exchange with said dilute aqueous wastes, preheating the dilute aqueous wastes prior to their introduction into the third fluidized bed with the hot water condensed in the third fluidized bed from steam produced in the second fluidized bed generating power from the steam developed in the third fluidized bed and recovering the spent steam from the second and third fluidized beds as product water.

2. Method according to claim 1 wherein combustible solids obtained in both stages of the fluidized bed evaporator are fed to the fluidized-bed steam generator.

References Cited

UNITED STATES PATENTS

| | | | |
|---|---|---|---|
| 3,306,236 | 2/1967 | Campbell | 110—8 R |
| 3,491,822 | 1/1970 | Ramaswami | 159—Dig. 3 |
| 3,438,869 | 4/1969 | Saavedra | 203—10 |
| 3,323,575 | 6/1967 | Greenfield | 110—8 R |
| 3,467,587 | 9/1969 | Connell | 203—Dig. 20 |
| 3,489,652 | 1/1970 | Williamson | 203—Dig. 20 |

NORMAN YUDKOFF, Primary Examiner

F. SEVER, Assistant Examiner

U.S. Cl. X.R.

60—108; 110—8 R; 203—23, 25